(12) United States Patent
McMindes et al.

(10) Patent No.: US 7,887,870 B2
(45) Date of Patent: *Feb. 15, 2011

(54) RESTRUCTURED MEAT PRODUCT AND PROCESS FOR PREPARING SAME

(75) Inventors: Matthew K. McMindes, Chesterfield, MO (US); Eduardo Godinez, Chesterfield, MO (US)

(73) Assignee: Solae, LLC, St. Louis, MO (US)

( * ) Notice: Subject to any disclaimer, the term of this patent is extended or adjusted under 35 U.S.C. 154(b) by 1188 days.

This patent is subject to a terminal disclaimer.

(21) Appl. No.: 10/919,421

(22) Filed: Aug. 16, 2004

(65) Prior Publication Data

US 2006/0035005 A1    Feb. 16, 2006

(51) Int. Cl.
   *A23L 1/31* (2006.01)
(52) U.S. Cl. ........................ 426/646; 426/652
(58) Field of Classification Search ................. 426/646, 426/652
   See application file for complete search history.

(56) References Cited

U.S. PATENT DOCUMENTS

| | | | | |
|---|---|---|---|---|
| 3,934,050 | A | | 1/1976 | Hawkins ..................... 426/645 |
| 4,402,987 | A | | 9/1983 | von Lersner et al. ........ 426/281 |
| 4,728,524 | A | | 3/1988 | Gagliardi, Jr. ............... 426/272 |
| 5,183,683 | A | | 2/1993 | Mott et al. ................... 426/641 |
| 5,300,312 | A | * | 4/1994 | Lusas et al. ................. 426/634 |
| 5,731,029 | A | | 3/1998 | Karwowski et al. ......... 426/646 |
| 5,827,561 | A | | 10/1998 | Duve .......................... 426/513 |
| 6,017,576 | A | | 1/2000 | Klossner et al. ............. 426/656 |
| 2002/0142086 | A1 | * | 10/2002 | Gaebler et al. .............. 426/573 |
| 2002/0160097 | A1 | * | 10/2002 | Altemueller et al. ........ 426/644 |

FOREIGN PATENT DOCUMENTS

CH    687 116 A5    9/1996

OTHER PUBLICATIONS

Lawrie, R.A. (1998). Lawrie's Meat Science. Woodhead Publishing, pp. 82-83 Online version available at: http://knovel.com/web/portal/browse/display?_EXT_KNOVEL_DISPLAY_bookid=302 &VerticalID=0.*

Pedersen, HE et al.: "Meat and Vegetarian Applilcations of Soy Protein Concentrates"; Food Tech Europe, vol. 1, No. 5, 1994, p. 90, 92, 94, XP009058004.

Berry, KE et al.: Prepartion of Soy Protein Concentrate Products and Their Application in Food Systems. American Oil Chemists Society 1991, 23, 8G9.

Lecomte NB. et al: "Soya Proteins Functional and Sensory Characteristics Improved in Comminuted Meats" Journal of Food Science, Institute of Food Technologists, Chicago, IL, 58(May/Jun. 1993), No. 3.

* cited by examiner

*Primary Examiner*—Keith D Hendricks
*Assistant Examiner*—Jyoti Chawla
(74) *Attorney, Agent, or Firm*—J. Jason Galvez; Holly M. Amjad

(57) ABSTRACT

This invention relates to a restructured meat product, comprising;

(A) a fibrous material containing soy protein and soy cotyledon fiber, wherein said soy cotyledon fiber is present in the fibrous material in an amount of from 1% to 8%, by weight on a moisture free basis;

(B) a comminuted meat; and (C) water.

In another embodiment, the invention discloses a process for preparing a restructured meat product, comprising the steps of; hydrating (A) a fibrous material containing soy protein and soy cotyledon fiber, wherein said soy cotyledon fiber is present in the fibrous material in an amount of from 1% to 8%, by weight on a moisture free basis in water until the water is absorbed and the fibers are separated; and adding (B) a comminuted meat, wherein the temperature of the comminuted meat is below 10° C.; and mixing the fibrous material and the comminuted meat to produce a homogeneous, fibrous and texturized meat product having a moisture content of at least 50%.

16 Claims, No Drawings

RESTRUCTURED MEAT PRODUCT AND PROCESS FOR PREPARING SAME

FIELD OF THE INVENTION

This invention relates to a restructured meat product as well as a process for preparing the restructured meat product by the addition of a fibrous material containing soy protein and soy cotyledon fiber, comminuted meat and water, such that a value added meat product having a texture similar to that of intact muscles is obtained.

BACKGROUND OF THE INVENTION

An important aspect of the present invention is the development of an untexturized protein product into a texturized protein product. Particularly, the present invention provides a product and method for taking an untexturized, paste-like, batter-like protein product with no visible grain or texture and converting it into a texturized, fibrous protein product with a definite shape having the consistency of cooked muscle meat.

The term texture describes a wide variety of physical properties of a food product. A product of acceptable texture is usually synonymous with the quality of a product. Texture has been defined as "the attribute of a substance resulting from a combination of physical properties and perceived by senses of touch, including kinaestheses and mouth feel, sight, and hearing. Texture, as defined by the International Organization of Standardization, is "all of the Theological and structural (geometric and surface) attributes of a food product perceptible by means of mechanical, tactual and, where appropriate, visual and auditory receptors." The following terms have been used to describe product characteristics falling under the umbrella "texture":

TABLE I

ABRIDGED LIST OF FOOD TEXTURE ADJECTIVES

| | | | |
|---|---|---|---|
| Adhesive | Fleshy | Mushy | Soft |
| Bouncy | Fluffy | Oily | Soggy |
| Brittle | Foamy | Pasty | Sparkly |
| Bubbly | Fragile | Plastic | Splintery |
| Chewy | Full-bodied | Porous | Spongy |
| Clingy | Gooey | Powdery | Springy |
| Coating | Grainy | Puffy | Sticky |
| Cohesive | Gritty | Pulpy | Stringy |
| Creamy | Gummy | Rich | Syrupy |
| Crisp | Hard | Rough | Tender |
| Crumbly | Heavy | Rubbery | Thick |
| Crusty | Heterogeneous | Runny | Thin |
| Dense | Juicy | Sandy | Tingly |
| Doughy | Lean | Scratchy | Tough |
| Dry | Light | Short | Uniform |
| Elastic | Limp | Silky | Viscous |
| Fatty | Lumpy | Slippery | Watery |
| Firm | Moist | Slivery | Waxy |
| Flaky | Mouth coating | | |
| Smooth | Wiggly | | |

Accelerated attention has been given to texture as it pertains to newer food substances including fabricated and imitation products, formed meat and fish products, where very serious efforts are made by processes to duplicate the properties of the original or other natural food substances. The use of non-traditional raw materials, synthetic flavors, fillers, and stretchers all tend to alter certain textural characteristics of the finished product. Frequently, the imitation of textural properties is of much greater difficulty in the replication of taste, odors, and colors. Numerous manipulative processes, including extrusion texturization, have been developed to simulate natural textural properties. The processes generally find it prudent to duplicate the properties of the original substances to the extent feasible technically and economically in order to promote early market acceptance. While texture has attributes related to appearance, it also has attributes related to touch and also mouth feel or interaction of food when it comes in contact with the mouth. Frequently, these sensory perceptions involved with chewing can relate to impressions of either desirability or undesirability.

Thus, textural terms include terms relating to the behavior of the material under stress or strain and include, for example, the following: firm, hard, soft, tough, tender, chewy, rubbery, elastic, plastic, sticky, adhesive, tacky, crispy, crunchy, etc. Secondly, texture terms may be related to the structure of the material: smooth, fine, powdery, chalky, lumpy, mealy, coarse, gritty, etc. Third, texture terms may relate to the shape and arrangement of structural elements, such as: flaky, fibrous, stringy, pulpy, cellular, crystalline, glassy, spongy, etc. Last, texture terms may relate to mouth feel characteristics, including: mouth feel, body, dry, moist, wet, watery, waxy, slimy, mushy, etc.

As used herein, "untexturized" and "texturized" describe the characteristics of the food product as set forth in Table II:

TABLE II

| Untexturized Characteristic | Texturized Characteristic | |
|---|---|---|
| Behavior of Material under Stress or Strain | sticky gooey plastic | firm chewy |
| Structure of Material | smooth | coarse |
| Shape and Arrangement of Structural Elements | gelatinous pulpy pasty | fibrous crusty |
| Mouth Feel | creamy mushy dry with body | moist |

U.S. Pat. No. 3,934,050 (Hawkins, Jan. 20, 1976) is concerned with manufacturing from meat comminute a cooked meat product with a surface that is grained, resembling that of slices cut in the direction of the muscle fibers from cooked meat of good quality. A meat comminute is extruded through a slit; and the flat comminute-extrudate thus obtained is cooked between and in intimate contact with layers of absorber heat-stable paper, at least one of the layers having a grained surface which is in contact with the extrudate, so that when the layers are separated from the cooked product, the product is left with an exposed grained surface.

U.S. Pat. No. 4,402,987 (von Lersner et al., Sep. 6, 1983) relates to upgrading low quality cuts of meat by introducing insoluble animal protein materials into the tissue of the meat cuts. An aqueous dispersion of the insoluble animal protein is prepared. The final dispersion contains from 10-5-% solids by weight. A binder is employed with the dispersion. The binder sets sufficiently at cooking temperatures to reduce losses associated with cooking. The binder also stabilizers the insoluble meat particles.

U.S. Pat. No. 4,728,524 (Gagliardi, Jr., Mar. 1, 1988) relates to restructured meat products and methods of making such meat products from meat parts, preferably fresh meat parts, which are intended to be cooked after restructuring. More particularly, the reference relates to the production of restructured meat products without the necessity of additives such as salt, phosphates or enzymes.

U.S. Pat. No. 5,183,683 (Mott et al., Feb. 2, 1993) provides a process for producing a functional vegetable product for use with animal protein materials, in which a non-hydrated vegetable proteinaceous extract is blended under conditions of shear with a quantity of water insufficient for full hydration of the extract and with a frozen animal food product, preferably animal protein product, having a temperature sufficiently low to render it essentially rigid, to produce a granular product containing said vegetable proteinaceous extract and said animal food product.

U.S. Pat. No. 5,731,0129 (Karwowski et al., Mar. 24, 1998) relates to a method for making jerky products. Meat, either frozen or not, is comminuted and then heated to partially denature the protein. The meat is cooled to cause the fat present to solidify. A binding agent is added to form a dough. The dough may be sheeted, baked or dried The dough may include a filler such as soy concentrates or isolates.

U.S. Pat. No. 5,827,561 (Duve, Oct. 27, 1998) relates to a process for producing a food product based on meat, animal proteins or vegetable protein, by preparing an emulsion from base components by first comminuting and emulsifying the base components. In the next processing step, the emulsion is loaded into a stuffing device, from which the emulsion then exits in the form of a single strand or numerous parallel strands. The strands are cooked and then cut into shorter strips, deep frozen and then packaged.

U.S. Pat. No. 6,017,576 (Klossner et al., Jan. 25, 2000) is directed to a method for the treatment of untexturized protein materials to form texturized protein materials. An untexturized past-like, moisture carrying protein product is added to an apparatus having steam injectors. Heating the product by steam injection causes the product to become texturized.

SUMMARY OF THE INVENTION

This invention relates to a restructured meat product, comprising;

(A) a fibrous material containing soy protein and soy cotyledon fiber, wherein said soy cotyledon fiber is present in the fibrous material in an amount of from 1% to 8%, by weight on a moisture free basis;

(B) a comminuted meat; and (C) water.

In another embodiment, the invention discloses a process for preparing a restructured meat product, comprising the steps of;

hydrating (A) a fibrous material containing soy protein and soy cotyledon fiber, wherein said soy cotyledon fiber is present in the fibrous material in an amount of from 1% to 8%, by weight on a moisture free basis in water until the water is absorbed and the fibers are separated; and adding (B) a comminuted meat, wherein the temperature of the comminuted meat is below 10° C.; and mixing the fibrous material and the comminuted meat to produce a homogeneous, fibrous and texturized meat product having a moisture content of at least 50%.

DETAILED DESCRIPTION OF THE INVENTION

Mechanically deboned meat (MDM) is a meat paste that is recovered from beef, pork and chicken bones using commercially available equipment. MDM is a comminuted product that is devoid of the natural fibrous texture found in intact muscles. The lack of fibrosity constrains the utility of MDM and most often limits its use to the manufacture of comminuted sausages such as frankfurters and bologna.

Definitions

As used herein, the term "soy material" is defined as a material derived from whole soybeans which contains no non-soy derived additives. Such additives may, of course, be added to a soy material to provide further functionality or nutrient content in an extruded meat analog containing the soy material. The term "soybean" refers to the species Glycine max, Glycine soja, or any species that is sexually cross compatible with Glycine max.

The term "protein content" as used herein, refers to the relative protein content of a soy material as ascertained by A.O.C.S. (American Oil Chemists Society) Official Methods Bc 4-91(1997), Aa 5-91(1997), or Ba 4d-90(1997), each incorporated herein in its entirety by reference, which determine the total nitrogen content of a soy material sample as ammonia, and the protein content as 6.25 times the total nitrogen content of the sample.

The Nitrogen-Ammonia-Protein Modified Kjeldahl Method of A.O.C.S. Methods Bc4-91 (1997), Aa 5-91 (1997), and Ba 4d-90(1997) used in the determination of the protein content may be performed as follows with a soy material sample. From 0.0250-1.750 grams of the soy material are weighed into a standard Kjeldahl flask. A commercially available catalyst mixture of 16.7 grams potassium sulfate, 0.6 grams titanium dioxide, 0.01 grams of copper sulfate, and 0.3 grams of pumice is added to the flask, then 30 milliliters of concentrated sulfuric acid is added to the flask. Boiling stones are added to the mixture, and the sample is digested by heating the sample in a boiling water bath for approximately 45 minutes. The flask should be rotated at least 3 times during the digestion. 300 milliliters of water is added to the sample, and the sample is cooled to room temperature. Standardized 0.5N hydrochloric acid and distilled water are added to a distillate receiving flask sufficient to cover the end of a distillation outlet tube at the bottom of the receiving flask. Sodium hydroxide solution is added to the digestion flask in an amount sufficient to make the digestion solution strongly alkaline. The digestion flask is then immediately connected to the distillation outlet tube, the contents of the digestion flask are thoroughly mixed by shaking, and heat is applied to the digestion flask at about a 7.5-min boil rate until at least 150 milliliters of distillate is collected. The contents of the receiving flask are then titrated with 0.25N sodium hydroxide solution using 3 or 4 drops of methyl red indicator solution— 0.1% in ethyl alcohol. A blank determination of all the reagents is conducted simultaneously with the sample and similar in all respects, and correction is made for blank determined on the reagents. The moisture content of the ground sample is determined according to the procedure described below (A.O.C.S Official Method Ba 2a-38). The nitrogen content of the sample is determined according to the formula: Nitrogen (%)=1400.67×[[(Normality of standard acid)×(Volume of standard acid used for sample (ml))]−[(Volume of standard base needed to titrate 1 ml of standard acid minus volume of standard base needed to titrate reagent blank carried through method and distilled into 1 ml standard acid (ml))×(Normality of standard base)]−[(Volume of standard base used for the sample (ml))×(Normality of standard base)]]/(Milligrams of sample). The protein content is 6.25 times the nitrogen content of the sample.

The term "moisture content" as used herein refers to the amount of moisture in a material. The moisture content of a material can be determined by A.O.C.S. (American Oil Chemists Society) Method Ba 2a-38 (1997), which is incorporated herein by reference in its entirety. According to the method, the moisture content of a material may be measured by passing a 1000 gram sample of the ground material through a 6×6 riffle divider, available from Seedboro Equipment Co., Chicago, Ill., and reducing the sample size to 100 grams. The 100 gram sample is then immediately placed in an airtight container and weighed. Five grams of the sample ("Sample Weight") are weighed onto a tared moisture dish (minimum 30 gauge, approximately 50×20 millimeters, with a tight-fitting slip cover—available from Sargent-Welch Co.). The dish containing the sample is placed in a forced draft oven and dried at 130±3° C. for 2 hours. The dish is then removed from the oven, covered immediately, and cooled in a dissector to room temperature. The dish is then weighed to obtain a Dry Weight. Moisture content is calculated according to the formula: Moisture content (%)=100×[(Sample Weight−Dry Weight)/Sample Weight].

The term "weight on a moisture free basis" as used herein refers to the weight of a material after it has been dried to completely remove all moisture, e.g. the moisture content of the material is 0%. Specifically, the weight on a moisture free basis of a soy material can be obtained by weighing the soy material after the soy material has been placed in a 45° C. oven until the soy material reaches a constant weight.

The term "soy protein isolate" as used herein is used in the sense conventional to the soy protein industry. Specifically, a soy protein isolate is a soy material having a protein content of at least 90% soy protein on a moisture free basis. "Isolated soy protein", as used in the art, has the same meaning as "soy protein isolate" as used herein and as used in the art. A soy protein isolate is formed from soybeans by removing the hull and germ of the soybean from the cotyledon, flaking or grinding the cotyledon and removing oil from the flaked or ground cotyledon, separating the soy protein and carbohydrates of the cotyledon from the cotyledon fiber, and subsequently separating the soy protein from the carbohydrates.

The term "soy protein concentrate" as used herein is used in the sense conventional to the soy protein industry. Specifically, a soy protein concentrate is a soy material having a protein content of from 65% up to 90% soy protein on a moisture-free basis. Soy protein concentrate also contains soy cotyledon fiber, typically from 3.5% to 5% soy cotyledon fiber by weight on a moisture-free basis. A soy protein concentrate is formed from soybeans by removing the hull and germ of the soybean from the cotyledon, flaking or grinding the cotyledon and removing oil from the flaked or ground cotyledon, and separating the soy protein and soy cotyledon fiber from the carbohydrates of the cotyledon.

The term "soy cotyledon fiber" as used herein refers to the fibrous portion of soy cotyledons containing at least 70% fiber (polysaccharide). Soy cotyledon fiber typically contains some minor amounts of soy protein, but may also be 100% fiber. Soy cotyledon fiber, as used herein, does not refer to, or include, soy hull fiber. To avoid confusion the term "fiber" as used herein (except in this paragraph) refers to fiber formed in the process of extruding a soy protein material, generally by protein-protein interactions, not soy cotyledon fiber. To further avoid confusion, soy cotyledon fiber will be referred to herein only as "soy cotyledon fiber" and not as "fiber." Soy cotyledon fiber is formed from soybeans by removing the hull and germ of the soybean from the cotyledon, flaking or grinding the cotyledon and removing oil from the flaked or ground cotyledon, and separating the soy cotyledon fiber from soy protein and carbohydrates of the cotyledon.

The term "comminuted meat" as used herein refers to a meat paste that is recovered from an animal carcass. The meat, on or off the bone is forced through a deboning device such that meat is separated from the bone and reduced in size. The meat is separated from the meat/bone mixture by forcing through a cylinder with small diameter holes. The meat acts as a liquid and is forced through the holes while the remaining bone material remains behind. The fat content of the comminuted meat may be adjusted upward by the addition of animal fat.

(A) The Fibrous Material

Component (A) is a fibrous material containing soy protein and soy cotyledon fiber. The fibrous material generally comprises a defatted soy protein material and soy cotyledon fiber. The fibrous material is produced by extruding the soy protein material and soy cotyledon fiber. The fibrous material has a moisture content of from 5% to 75%. Moisture conditions employed in producing the fibrous material are low moisture fibrous material (5% to 35%) and high moisture fibrous material (50% to 80%). Additional ingredients may be extruded with the soy protein material and the soy cotyledon fiber such as wheat gluten, starch and flavor ingredients. In producing a fibrous material, the above ingredients are heated along with water under increasing temperature, pressure and shear conditions in a cooker extruder, and extruding the ingredient mixture through a die. Upon extrusion, the extrudate generally expands to form a fibrous cellular structure as it enters a medium of reduced pressure (usually atmospheric). Extrusion methods for forming fibrous materials are well known and disclosed, for example, in U.S. Pat. No. 4,099,455.

The soy protein material utilized is a soy protein isolate, a soy protein concentrate, or a blend of a soy protein isolate with another soy protein containing material, such as a soy protein concentrate or a soy flour. If the soy protein containing material is a blend, the blend of soy protein isolate and another soy protein containing material should contain at least 50% soy protein isolate, by weight of the combined soy protein isolate and other soy protein containing material, in order to assure good protein fiber formation in the product.

The soy protein content, irrespective of being a low moisture fibrous material or a high moisture fibrous material is from 70% to 80% by weight on a moisture free basis. For a low moisture fibrous material, the soy protein content, including the moisture, is from 50% to 75% by weight. For a high moisture fibrous material, the soy protein content, including the moisture, is from 25% to 50% by weight.

Furthermore, the soy protein isolate should not be a highly hydrolyzed soy protein isolate having a low molecular weight distribution since highly hydrolyzed soy protein isolates lack the protein chain length to properly form protein fibers in the process. Highly hydrolyzed soy protein isolates, however, may be used in combination with other soy protein isolates provided that the highly hydrolyzed soy protein isolate content of the combined soy protein isolates is less than 40% of the combined soy protein isolates, by weight.

The soy protein isolate utilized should have a water holding capacity sufficient to enable the protein in the isolate to form fibers upon extrusion. The water holding capacity of the soy protein isolate is a measure of the amount of swelling the protein undergoes when hydrated. The swelling of the protein should be sufficient to enable the protein to form intermolecular contacts to permit fiber formation to occur. The soy protein isolate used in the process of the invention preferably has a water holding capacity of at least 4.0 grams of water per gram of soy protein isolate (as is) at pH 7.0, and more preferably has a water holding capacity of at least 5.0 grams of water per gram of soy protein isolate (as is) at pH 7.0. The water holding capacity is determined by using the centrifuge method.

Non-highly hydrolyzed soy protein isolates having a water holding capacity of at least 4.0 grams of water per gram of soy protein isolate that are useful in the present invention are commercially available, for example, from Solae, LLC (St. Louis, Mo.), and include SUPRO® 500E, SUPRO® EX 33, SUPRO® 620, SUPRO® 630 and SUPRO® 545.

Soy protein isolates useful in the fibrous material may be produced from soybeans according to conventional processes in the soy protein manufacturing industry. Exemplary of such a process, whole soybeans are initially detrashed, cracked, dehulled, degermed, and defatted according to conventional processes to form soy flakes, soy flour, soy grits, or soy meal. The soybeans may be detrashed by passing the soybeans through a magnetic separator to remove iron, steel, and other magnetically susceptible objects, followed by shaking the soybeans on progressively smaller meshed screens to remove soil residues, pods, stems, weed seeds, undersized beans, and other trash. The detrashed soybeans may be cracked by passing the soybeans through cracking rolls. Cracking rolls are spiral-cut corrugated cylinders which loosen the hull as the soybeans pass through the rolls and crack the soybean material into several pieces. The cracked soybeans may then be dehulled by aspiration. The dehulled soybeans are degermed by shaking the dehulled soybeans on a screen of sufficiently small mesh size to remove the small sized germ and retain the larger cotyledons of the beans. The cotyledons are then flaked by passing the cotyledons through a flaking roll. The flaked cotyledons are defatted by extracting oil from the flakes by mechanically expelling the oil from the flakes or by contacting the flakes with hexane or other suitable lipophilic/hydrophobic solvent. The defatted flakes may be ground to form a soy flour, a soy grit, or a soy meal, if desired.

The defatted soy flakes, soy flour, soy grits, or soy meal is/are then extracted with an aqueous alkaline solution, typically a dilute aqueous sodium hydroxide solution having a pH of from 7.5 to 11.0, to extract protein soluble in an aqueous alkaline solution from insolubles. The insolubles are soy cotyledon fiber which is composed primarily of insoluble carbohydrates. An aqueous alkaline extract containing the soluble protein is subsequently separated from the insolubles, and the extract is then treated with an acid to lower the pH of the extract to around the isoelectric point of the soy protein, preferably to a pH of from 4.0 to 5.0, and most preferably to a pH of from 4.4 to 4.6. The soy protein precipitates from the acidified extract due to the protein's lack of solubility in an aqueous solution at or near its isoelectric point. The precipitated protein curd is then separated from the remaining extract (whey). The separated protein may be washed with water to remove residual soluble carbohydrates and ash from the protein material. The separated protein is then dried using conventional drying means such as spray drying or tunnel drying to form a soy protein isolate.

Soy protein concentrate may be blended with the soy protein isolate to substitute for a portion of the soy protein isolate as a source of soy protein. Soy protein isolates, in general, have higher water holding capacity and form better fibers than soy protein concentrates. Therefore, the amount of soy protein concentrate substituted for soy protein isolate should be limited to an amount that will permit significant fiber formation in the extrudate. Preferably, if a soy protein concentrate is substituted for a portion of the soy protein isolate, the soy protein concentrate is substituted for up to 40% of the soy protein isolate by weight, at most, and more preferably is substituted for up to 30% of the soy protein isolate by weight.

Soy protein concentrates useful in the fibrous material are commercially available. For example, soy protein concentrates Promine DSPC, Procon, Alpha 12 and Alpha 5800 are available from Solae®, LLC (St. Louis, Mo.). Soy protein concentrates useful in the present invention may also be produced from soybeans according to conventional processes in the soy protein manufacturing industry. For example, defatted soy flakes, soy flour, soy grits, or soy meal produced as described above may be washed with aqueous ethanol (preferably 60% to 80% aqueous ethanol) to remove soluble carbohydrates from the soy protein and soy fiber. The soy protein and soy fiber containing material is subsequently dried to produce the soy protein concentrate. Alternatively, the defatted soy flakes, soy flour, soy grits, or soy meal may be washed with an aqueous acidic wash having a pH of from 4.3 to 4.8 to remove soluble carbohydrates from the soy protein and soy fiber. The soy protein and soy fiber containing material is subsequently dried to produce the soy protein concentrate.

The soy cotyledon fiber utilized in the fibrous material should effectively bind water when the mixture of soy protein material and soy cotyledon fiber are co-extruded. By binding water, the soy cotyledon fiber induces a viscosity gradient across the extrudate as the extrudate is extruded through a cooling die, thereby promoting the formation of protein fibers. To effectively bind water for the purposes of the process of the present invention, the soy cotyledon fiber should have a water holding capacity of at least 5.50 grams of water per gram of soy cotyledon fiber, and preferably the soy cotyledon fiber has a water holding capacity of at least 6.0 grams of water per gram of soy cotyledon fiber. It is also preferable that the soy cotyledon fiber has a water holding capacity of at most 8.0 grams of water per gram of soy cotyledon fiber.

The soy cotyledon fiber is a complex carbohydrate and is commercially available. For example, FIBRIM® 1260 and FIBRIM® 2000 are soy cotyledon fiber materials that are commercially available from Solae, LLC (St. Louis, Mo.) that work well in the process of the present invention. Soy cotyledon fiber useful in the process of the present invention may also be produced according to conventional processes in the soy processing industry. For example, defatted soy flakes, soy flour, soy grits, or soy meal produced as described above may be extracted with an aqueous alkaline solution as described above with respect to the production of a soy protein isolate to separate the insoluble soy cotyledon fiber from the aqueous alkaline soluble soy protein and carbohydrates. The separated soy cotyledon fiber is then dried, preferably by spray drying, to produce a soy cotyledon fiber product. Soy cotyledon fiber is generally present in the fibrous material at from 1% to 8%, preferably at from 1.5% to 7.5% and most preferably at from 2% to 5% by weight on a moisture free basis.

A modest concentration of soy fiber is believed to be effective in obstructing cross-linking of protein molecules, thus preventing excessive gel strength from developing in the cooked extrusion mass exiting the die. Unlike the protein, which also absorbs moisture, soy fiber readily releases moisture upon release of pressure at the die exit temperature.

Wheat gluten may be used as an ingredient to be mixed and extruded with the soy protein material and soy cotyledon fiber. Wheat gluten provides an economical source of protein, and may be substituted for a portion of the soy protein material. The protein of wheat gluten has a very low water holding capacity and is ineffective to form significant protein fibers by itself upon extrusion. Therefore, the amount of wheat gluten in the mixture of soy protein material, soy cotyledon fiber, and other ingredients should be limited to less than 60% of the mixture on a dry ingredient basis. Preferably wheat gluten is present in the low moisture fibrous material at from 10% to 30% by weight on a moisture free basis and in the high moisture fibrous material at from 30% to 50% by weight on a moisture free basis. Wheat gluten is a commercially available ingredient. A preferred commercially available wheat gluten useful in the present invention is Gem of the Star Gluten, available from Manildra Milling.

A starch material may also be used as an ingredient to be mixed and extruded with the soy protein material and soy cotyledon fiber. Starch may be used to provide texture to the fibrous material produced by extruding the soy protein material, soy cotyledon fiber, starch, and other ingredients. The starch material used is preferably a naturally occurring starch. The starch material may be isolated from a variety of plants such as corn, wheat, potato, rice, arrowroot, and cassava by well-known, conventional methods. Starch materials useful in the process of the present invention include the following commercially available starches: corn, wheat, potato, rice, high amylose corn, waxy maize, arrowroot, and tapioca. Preferably the starch material used is a corn starch or a wheat starch, and most preferably is a commercially available dent corn starch or native wheat starch. The starch is present in the low moisture fibrous material at from 5% to 15% by weight on a moisture free basis and in the high moisture fibrous material at from 1% to 5% by weight on a moisture free basis. A preferred dent corn starch is commercially available from A. E. Staley Mfg., Co. sold as Dent Corn Starch, Type IV, Pearl.

Preferably, flavor ingredients are also mixed and extruded with the soy protein material and the soy cotyledon fiber. The preferred flavor ingredients are those that provide a meat-like flavor to the fibrous material produced by extruding the soy protein material and soy cotyledon fiber. Preferred flavor ingredients include beef flavor, chicken flavor, grill flavor, and malt extract, all commercially available from flavor ingredient manufacturers.

A suitable extrusion process for the preparation of a low moisture fibrous material comprises introducing the particular ingredients of the soy protein containing material, soy cotyledon fiber, wheat gluten and starch formulation into a mixing tank (i.e., an ingredient blender) to combine the ingredients and form a dry blended fibrous material pre-mix. The dry blended fibrous material pre-mix is then transferred to a hopper from which the dry blended ingredients are introduced into a pre-conditioner to form a conditioned fibrous material mixture. The conditioned fibrous material is then fed to an extrusion apparatus (i.e., extruder) in which the fibrous material mixture is heated under mechanical pressure generated by the screws of the extruder to form a molten extrusion mass. The molten extrusion mass exits the extruder through an extrusion die.

In the pre-conditioner, the particulate solid ingredient mix is preheated, contacted with moisture, and held under controlled temperature and pressure conditions to allow the moisture to penetrate and soften the individual particles. The preconditioning step increases the bulk density of the particulate fibrous material mixture and improves its flow characteristics. The preconditioner contains one or more paddles to promote uniform mixing of the protein and transfer of the protein mixture through the preconditioner. The configuration and rotational speed of the paddles vary widely, depending on the capacity of the preconditioner, the extruder throughput and/or the desired residence time of the fibrous material mixture in the preconditioner or extruder barrel. Generally, the speed of the paddles is from about 500 to about 1300 revolutions per minute (rpm).

Typically, the fibrous material mixture is pre-conditioned prior to introduction into the extrusion apparatus by contacting the pre-mix with moisture (i.e., steam and/or water) at a temperature of at least about 45° C. (110° F.). It has been observed, however, that higher temperatures (i.e., temperatures above 85° C. (185° F.)) in the preconditioner may encourage starches to gelatinize, which in turn may cause lumps to form, which may impede flow of the protein mixture from the preconditioner to the extruder barrel.

Typically, the fibrous material pre-mix is conditioned for a period of about 30 to about 60 seconds, depending on the speed and the size of the conditioner. The fibrous material pre-mix is contacted with steam and/or water and heated in the pre-conditioner at generally constant steam flow to achieve the desired temperatures. The water and/or steam conditions (i.e., hydrates) the fibrous material mixture, increases its density, and facilitates the flowability of the dried mix without interference prior to introduction to the extruder barrel where the proteins are texturized.

The conditioned pre-mix may contain from about 5% to about 30% (by weight) water. The conditioned pre-mix typically has a bulk density of from about 0.25 g/cm$^3$ to about 0.6 g/cm$^3$. Generally, as the bulk density of the pre-conditioned protein mixture increases within this range, the protein mixture is easier to process. This is presently believed to be due to such mixtures occupying all or a majority of the space between the screws of the extruder, thereby facilitating conveying the extrusion mass through the barrel.

The conditioned pre-mix is generally introduced to the extrusion apparatus at a rate of no more than about 10 kilograms (kg)/min (no more than about 20 lbs/min). Generally, it has been observed that the density of the extrudate decreases as the protein rate of pre-mix to the extruder increases.

Extrusion devices have long been used in the manufacture of a wide variety of edible products. One suitable extrusion device is a double-barrel, twin screw extruder as described, for example, in U.S. Pat. No. 4,600,311. Examples of commercially available double-barrel, twin screw extrusion apparatus include a CLEXTRAL Model BC-72 extruder manufactured by Clextral, Inc. (Tampa, Fla.); a WENGER Model TX-57 extruder manufactured by Wenger (Sabetha, Kans.); and a WENGER Model TX-52 extruder manufactured by Wenger (Sabetha, Kans.). Other conventional extruders suitable for use in this invention are described, for example, in U.S. Pat. Nos. 4,763,569, 4,118,164, and 3,117,006, which are incorporated by reference.

The screws of a twin screw extruder can rotate within the barrel in the same or opposite directions. Rotation of the screws in the same direction is referred to as single flow whereas rotation of the screws in opposite directions is referred to as double flow. The speed of the screw or screws of the extruder may vary depending on the particular apparatus. However, the screw speed is typically from about 250 to about 350 revolutions per minute (rpm). Generally, as the screw speed increases, the density of the extrudate decreases.

The extrusion apparatus generally comprises a plurality of heating zones through which the protein mixture is conveyed under mechanical pressure prior to exiting the extrusion apparatus through an extrusion die. The temperature in each successive heating zone generally exceeds the temperature of the previous heating zone by between about 10° C. and about 70° C. (between about 15° F. and about 125° F.). In one embodiment, the conditioned pre-mix is transferred through four heating zones within the extrusion apparatus, with the protein mixture heated to a temperature of from about 100° C. to about 150° C. (from about 212° F. to about 302° F.) such that the molten extrusion mass enters the extrusion die at a temperature of from about 100° C. to about 150° C. (from about 212° F. to about 302° F.).

The pressure within the extruder barrel is not narrowly critical. Typically the extrusion mass is subjected to a pressure of at least about 400 psig (about 28 bar) and generally the pressure within the last two heating zones is from about 1000 psig to about 3000 psig (from about 70 bar to about 210 bar). The barrel pressure is dependent on numerous factors including, for example, the extruder screw speed, feed rate of the mixture to the barrel, feed rate of water to the barrel, and the viscosity of the molten mass within the barrel.

Water is injected into the extruder barrel to hydrate the fibrous material mixture and promote texturization of the proteins. As an aid in forming the molten extrusion mass the water may act as a plasticizing agent. Water may be introduced to the extruder barrel via one or more injection jets in communication with a heating zone. Typically, the mixture in the barrel contains from about 15% to about 30% by weight water. The rate of introduction of water to any of the heating zones is generally controlled to promote production of an extrudate having desired characteristics. It has been observed that as the rate of introduction of water to the barrel decreases, the density of the extrudate decreases. Typically, less than about 1 kg of water per kg of protein is introduced to the barrel. Generally, from about 0.1 kg to about 1 kg of water per kg of protein are introduced to the barrel.

The molten extrusion mass in the extrusion apparatus is extruded through a die to produce an extrudate, which may then dried in a dryer.

Extrusion conditions are generally such that the product emerging from the extruder barrel typically has a moisture content of from about 20% to about 45% (by weight) wet basis. The moisture content is derived from water present in the mixture introduced to the extruder, moisture added during preconditioning and/or any water injected into the extruder barrel during processing.

Upon release of pressure, the molten extrusion mass exits the extruder barrel through the die, superheated water present in the mass flashes off as steam, causing simultaneous expansion (i.e., puffing) of the material. The level of expansion of the extrudate upon exiting of the mixture from the extruder in terms of the ratio of the cross-sectional area of extrudate to the cross-sectional area of die openings is generally less than about 15:1. Typically, the ratio of the cross-sectional area of extrudate to the cross-sectional area of die openings is from about 2:1 to about 11:1.

The extrudate is cut after exiting the die. Suitable apparatus for cutting the extrudate include flexible knives manufactured by Wenger (Sabetha, Kans) and Clextral (Tampa, Fla.).

The dryer, if one is used for the low moisture fibrous material, to dry the extrudates generally comprises a plurality of drying zones in which the air temperature may vary. Generally, the temperature of the air within one or more of the zones will be from about 135° C. to about 185° C. (from about 280° F. to about 370° F.). Typically, the extrudate is present in the dryer for a time sufficient to provide an extrudate having a desired moisture content. This desired moisture content may vary widely depending on the intended application of the extrudate and, typically, is from 6% to 13% by weight, on a moisture free basis. Generally, the extrudate is dried for at least about 5 minutes and, more generally, for at least about 10 minutes. Suitable dryers include those manufactured by Wolverine Proctor & Schwartz (Merrimac, Mass.), National Drying Machinery Co. (Philadelphia, Pa.), Wenger (Sabetha, Kans.), Clextral (Tampa, Fla.), and Buehler (Lake Bluff, Ill.).

The dried extrudates may further be comminuted to reduce the average particle size of the extrudate. Suitable grinding apparatus include hammer mills such as Mikro Hammer Mills manufactured by Hosokawa Micron Ltd. (England).

Prior to combining the low moisture fibrous material (A) with the comminuted meat (B), the fibrous material having a moisture content of from 6% to 13% by weight, on a moisture free basis if dried, needs to be hydrated in water until the water is absorbed and the fibers are separated. If the fibrous material is not dried, its moisture content is higher, generally from 16% to 30% by weight, on a moisture free basis. The non-dried fibrous material needs to be hydrated prior to combining with the comminuted meat. However, when a non-dried fibrous material is used, less water is necessary for hydrating the fibrous material and hydration of the fibrous material occurs much faster.

The ingredients employed to make a low moisture fibrous material of from 5% to 35% by weight, on a moisture free basis are also used to make a high moisture fibrous material of from 50% to 80% by weight, on a moisture free basis. The soy protein material, soy cotyledon fiber and other ingredients are dry blended and mixed in a mixing tank to combine the ingredients and form a dry blended fibrous material pre-mix. Alternatively, the soy protein material, soy cotyledon fiber and other ingredients may be mixed directly with water to form a dough, without being dry blended first, preferably in a preconditioner.

Preferably the dough mixture including the dry ingredients and the water is conditioned for extrusion in the preconditioner by heating the dough mixture. Preferably the dough mixture is heated to a temperature of from 50° C. to 80° C., more preferably from 60° C. to 75° C. in the preconditioner.

The dough mixture is then fed into a cooking extruder to heat, shear, and, ultimately, to plasticize the dough mixture. The cooking extruder may be selected from commercially available cooking extruders. Preferably the cooking extruder is a single screw extruder, or more preferably a twin screw extruder, that mechanically shears the dough with the screw elements. Commercially available cooking extruders useful in the practice of the present invention include Clextral extruders, commercially available from Clextral, Inc., Tampa, Fla.; Wenger extruders, commercially available from Wenger, Inc, Sabetha, Kans.; and Evolum extruders, commercially available from Clextral, Inc. A particularly preferred cooking extruder for the practice of the present invention is a Clextral BC72 cooking extruder, available from Clextal, Inc. Another preferred cooking extruder for the practice of the present invention is an EV32 twin screw extruder from Evolum.

The dough mixture is subjected to shear and pressure by the cooking extruder to plasticize the dough mixture. The screw elements of the cooking extruder shear the dough mixture as well as create pressure in the extruder by forcing the dough mixture forward though the extruder and through the die. The screw motor speed determines the amount of shear and pressure applied to the dough mixture by the screw(s). Preferably the screw motor speed is set to a speed of from 200 rpm to 500 rpm, and more preferably from 300 rpm to 400 rpm, which moves the dough mixture through the extruder at a rate of at least 20 kilograms per hour, and more preferably at least 40 kilograms per hour. Preferably the cooking extruder generates an extruder barrel exit pressure of from 500 to 1500 psig, and more preferably an extruder barrel exit pressure of from 600 to 1000 psig is generated.

The dough mixture is heated by the cooking extruder as it passes through the extruder. Heating denatures the protein in the dough mixture enabling the dough mixture to plasticize. The cooking extruder includes a means for heating the dough mixture to temperatures of from 100° C. to 180° C. Preferably the means for heating the dough mixture in the cooking extruder comprises extruder barrel jackets into which heating or cooling media such as steam or water may be introduced to control the temperature of the dough mixture passing through the extruder. The cooking extruder may also include steam injection ports for directly injecting steam into the dough mixture within the extruder. The cooking extruder preferably includes multiple heating zones that can be controlled to independent temperatures, where the temperatures of the heating zones are preferably set to increase the temperature of the dough mixture as the dough mixture proceeds through, the extruder. For example, the cooking extruder may be set in a four temperature zone arrangement, where the first zone (adjacent the extruder inlet port) is set to a temperature of from 80° C. to 100° C., the second zone is set to a temperature of from 100° C. to 135° C., the third zone is set to a temperature of from 135° C. to 150° C., and the fourth zone (adjacent the extruder exit port) is set to a temperature of from 150° C. to 180° C. The cooking extruder may be set in other temperature zone arrangements, as desired. For example, the cooking extruder may be set in a five temperature zone arrangement, where the first zone is set to a temperature of 25° C., the second zone is set to a temperature of 50° C., the third zone is set to a temperature of 95° C., the fourth zone is set to a temperature of 130° C., and the fifth zone is set to a temperature of 150° C.

A long cooling die is attached to the cooking extruder so the plasticized dough mixture flows from the extruder through the cooling die upon exiting the extruder exit port. The dough mixture forms a melted plasticized mass in the cooking extruder that flows from the cooking extruder into the die. The cooling die cools and shapes the hot dough mixture as it exits cooking extruder. Fiber formation is induced in the plasticized dough mixture by the cooling effect of the cooling die to form the fibrous meat analog product. The fibrous material exits the cooling die through at least one aperture in the die face, which may be a die plate affixed to the die. The fibrous material extrudate is cut into desired lengths with a cutting knife positioned adjacent the die aperture(s) to cut the extrudate as it exits the die aperture(s).

The cooling die is maintained at a temperature significantly cooler than the temperature in the cooking extruder in the final temperature zone of the extruder adjacent the die. The cooling die includes means for maintaining the temperature at a temperature significantly cooler than the exit temperature of the cooking extruder. Preferably the cooling die includes inlet and outlet ports for circulating media for maintaining the die temperature. Most preferably, constant temperature water is circulated through the cooling die as the circulating media for maintaining the desired die temperature. Preferably, the cooling die is maintained at a temperature of from 80° C. to 110° C., more preferably the cooling die is maintained at a temperature of from 85° C. to 105° C., and most preferably the cooling die is maintained at a temperature of from 90° C. to 100° C.

The cooling die is preferably a long cooling die to ensure that the plasticized dough material is cooled sufficiently in transit through the die to induce proper fiber formation. In a preferred embodiment, the die is at least 200 millimeters long, and more preferably is at least 500 millimeters long. Long cooling dies useful in the practice of the process of the present invention are commercially available, for example from Clextral, Inc., E. I. duPont de Nemours and Company, and Kobe Steel, Ltd.

The width and height dimensions of the cooling die aperture(s) are selected and set prior to extrusion of the dough mixture to provide the fibrous material extrudate with the desired dimensions. The width of the die aperture(s) may be set so that the extrudate resembles from a cubic chunk of meat to a steak filet, where widening the width of the die aperture(s) decreases the cubic chunk-like nature of the extrudate and increases the filet-like nature of the extrudate. Preferably the width of the cooling die aperture(s) is/are set to a width of from 10 millimeters to 40 millimeters, and most preferably from 25 millimeters to 30 millimeters.

The height dimension of the cooling die aperture(s) may be set to provide the desired thickness of the extrudate. The height of the aperture(s) may be set to provide a very thin extrudate or a thick extrudate. A novel feature of the present invention is that the height of the aperture(s) may be set to at least 12 millimeters, and the resulting extrudate is fibrous across the entirety of any cross-section of the extrudate. Prior to the present invention, high moisture extrudates having a thickness of at least 12 millimeters (as determined by the height of the cooling die aperture(s)) gelled in the center of the extrudate, and were not fibrous across the entirety of a transverse cross-section of the extrudate. Preferably, the height of the cooling die aperture(s) may be set to from 1 millimeter to 30 millimeters, and more preferably from 12 millimeters to 25 millimeters, and most preferably from 15 millimeters to 20 millimeters.

Due to the high moisture content of the dough mixture, little dissipation of energy and expansion occurs in the fibrous material extrudate as it exits the die aperture(s). As a result, the fibrous material is relatively dense compared to a low moisture extrudate, since few air vacuoles are introduced into the fibrous material extrudate by expansion of the extrudate upon extrusion from the die.

The high moisture fibrous material contains from 30% to 50% wheat gluten by weight, on a moisture free basis, 1% to 5% starch by weight, on a moisture free basis and 1% to 8% soy cotyledon fiber by weight, on a moisture free basis. Preferably the moisture content is from 60% to 75%.

One example of a fibrous material containing soy protein and soy cotyledon fiber for use in the restructured meat product described herein is FXP MO339, available from The Solae, Co. (St. Louis, Mo.). FXP MO339 is an extruded dry textured soy protein product with suitable fibrosity and texture, and a suitable amount of soy protein. Specifically, FXP MO339 comprises about 70% by weight soy protein, about 2% by weight of fiber, about 23% by weight of wheat gluten, about 9% by weight of starch and about 10% by weight moisture. Another example of a fibrous material containing soy protein and soy cotyledon fiber for use in the restructured meat product described herein is VETEX 1000, available from Stentorian Industries Company Limited (Taiwan). A third example of a fibrous material containing soy protein and soy cotyledon fiber for use in the restructured meat product described herein is FXP MO327, available from The Solae Co. (St. Louis, Mo.). FXP MO327 is an extruded dry textured soy protein product with suitable fibrosity and texture, and a suitable amount of soy protein. Specifically, FXP MO327 comprises about 30% by weight soy protein, about 1% by weight of fiber, about 17% by weight of wheat gluten, about 1% by weight of starch and about 60% by weight moisture.

(B) The Comminuted Meat

It is well known in the art to produce mechanically deboned or separated raw meats using high-pressure machinery that separates bone from animal tissue, by first crushing bone and adhering animal tissue and then forcing the animal tissue, and not the bone, through a sieve or similar screening device. The animal tissue in the present invention comprises muscle tissue, organ tissue, connective tissue and skin. The process forms an untexturized, paste-like blend of soft animal tissue with a batter-like consistency and is commonly referred to as mechanically deboned meat or MDM. This past-like blend has a particle size of from 1 to 10 millimeters, preferably up to 5 millimeters and most preferably up to 3 millimeters.

Although the animal tissue, also known as raw meat, is preferably provided in at least substantially frozen form so as to avoid microbial spoilage prior to processing, once the meat is ground, it is not necessary to freeze it to provide cuttability into individual strips or pieces. Unlike meat meal, raw meat has a natural high moisture content of above 50% and the protein is not denatured.

The raw meat used in the present invention may be any edible meat suitable for human consumption. The meat may be non-rendered, non-dried, raw meat, raw meat products, raw meat by-products, and mixtures thereof. The meat or meat products are comminuted and generally supplied daily in a completely frozen or at least substantially frozen condition so as to avoid microbial spoilage. Generally the temperature of the comminuted meat is below 10° C., preferably is from −4° C. to 6° C. and most preferably from −2° C. to 2° C. While refrigerated or chilled meat may be used, it is generally impractical to store large quantities of unfrozen meat for extended periods of time at a plant site. The frozen products provide a longer lay time than do the refrigerated or chilled products. Beef, pork, chicken, and turkey are preferred meat products intended for human consumption. Specific examples of animal food products which may be used in the process of the present invention include pork shoulder, beef shoulder, beef flank, turkey thigh, beef liver, ox heart, pigs heart, pork heads, pork skirt, beef mechanically deboned meat, pork mechanically deboned meat and chicken mechanically deboned meat. Mechanically deboned beef, mechanically deboned pork and mechanically deboned chicken are preferred.

In lieu of frozen comminuted meat, the comminuted meat may be freshly prepared for the preparation of the restructured meat product, as long as the freshly prepared comminuted meat meets the temperature conditions of not more than 10° C.

The moisture content of the raw frozen or unfrozen meat is generally at least about 50% by weight, and most often from about 60% by weight to about 75% by weight, based upon the weight of the raw meat. In embodiments of the invention, the fat content of the raw frozen or unfrozen meat may be at least 2% by weight, generally from about 15% by weight to about 20% by weight. In other embodiments of the invention, meat products having a fat content of less than about 10% by weight and defatted meat products may be used.

The frozen or chilled meat may be stored at a temperature of about −18° C. to about 0° C. It is generally supplied in 50 pound blocks. Upon use, the blocks are permitted to thaw up to 10° C., that is, to defrost, but in a tempered environment. Thus, the outer layer of the blocks, for example up to a depth of about ¼", may be defrosted or thawed but still at a temperature of about 0° C., while the remaining inner portion of the blocks, while still frozen, are continuing to thaw and thus keeping the outer portion at below 10° C.

The term "meat" is understood to apply not only to the flesh of cattle, swine, sheep and goats, but also horses, whales and other mammals, poultry and fish. The term "meat by-products" is intended to refer to those non-rendered parts of the carcass of slaughtered animals including but not restricted to mammals, poultry and the like and including such constituents as are embraced by the term "meat by-products" in the Definitions of Feed Ingredients published by the Association of American Feed Control Officials, Incorporated. The terms "meat," and "meat by-products," are understood to apply to all of those animal, poultry and marine products defined by said association.

Examples of meat which may be used are mammalian meat such as beef, veal, pork, and horsemeat, and the fleshy tissue from bison, cows, deer, elk, and the like. Poultry meat which may be used includes chicken, turkey, duck, or goose and the like. Embodiments of the invention may also utilize the flesh of fish and shell fish. Meat includes striated muscle which is skeletal or that which is found, for example, in the tongue, diaphragm, heart, or esophagus, with or without accompanying overlying fat and portions of the skin, sinew, nerve and blood vessels which normally accompany the meat flesh. Examples of meat by-products are organs and tissues such as lungs, spleens, kidneys, brain, liver, blood, bone, partially defatted low-temperature fatty tissues, stomachs, intestines free of their contents, and the like. Poultry by-products include non rendered clean parts of carcasses of slaughtered poultry such as heads, feet, and viscera, free from fecal content and foreign matter.

(C) Water

Employed as water (C), is tap water, distilled water or deionized water. The purpose of the water is to hydrate the ingredients of soy protein, soy cotyledon fiber, wheat gluten and starch contained within the fibrous material such that these ingredients absorb the water and that the soy cotyledon fibers contained within the fibrous material become separated. Typically, the ratio of fibrous material on a moisture free basis to the hydration water is from 1:0.5 to 10, preferably from 1:1 to 7 and most preferably from 1:2 to 5. More water for hydration is employed when a low moisture fibrous material is utilized in the restructured meat product. Less water for hydration is employed when a high moisture fibrous material is utilized in the restructured meat product. The temperature of the water may range from 0° C. up to 30° C. Hydration time may be from 30 minutes up to several hours, depending upon the moisture content of the fibrous material, the amount of water utilized and the temperature of the water.

At a minimum, the restructured meat product comprises (A) a fibrous material containing soy protein and soy cotyledon fiber, wherein said soy cotyledon fiber is present in the fibrous material in an amount of from 1% to 8%, by weight on a moisture free basis;

(B) a comminuted meat; and (C) water.

The restructured meat product is prepared by a process comprising the steps of;

hydrating (A) a fibrous material containing soy protein and soy cotyledon fiber, wherein said soy cotyledon fiber is present in the fibrous material in an amount of from 1% to 8%, by weight on a moisture free basis in water until the water is absorbed and the fibers are separated; and adding (B) a comminuted meat, wherein the temperature of the comminuted meat is below 10° C.; and mixing the fibrous material and the comminuted meat to produce a homogeneous, fibrous and texturized meat product having a moisture content of at least 50%.

Prior to hydration of the fibrous material, the weight ratio of fibrous material on a moisture free basis to the comminuted meat on a moisture free basis is generally from 1:0.25 to 50, preferably from 1:1 to 40 and most preferably from 1:2 to 20. The hydrated fibrous material and the comminuted meat are combined in a mixing device and mixed to give a homogeneous restructured meat product.

The product and process of this invention are completed by combining Components (A), (B) and (C) as per the disclosed ratios of (A):(B) and (A):(C). The fibrous material (A) is first hydrated with water (C). When hydration is complete, the comminuted meat (B) is added and the contents are mixed until a homogeneours mass of a restructured meat product is obtained. At this point, the homogeneous restructured meat product may be formed into strips, steaks, cutlets or patties, either by hand or by machine. The homogenous restructured meat product may also be stuffed into permeable or impermeable casings.

The restructured meat product may also further comprise a gelling protein; an animal fat; sodium chloride; sodium tripolyphosphate; a colorant; a curing agent; a flavorant comprising beef flavor, pork flavor, or chicken flavor; or mixtures of each with the other.

The gelling protein is a soy protein isolate. This is the same soy protein isolate that is utilized in the preparation of the fibrous material. The soy protein isolate useful as a gelling protein is a high viscosity and/or medium/high gelling isolated soy protein. The gelling protein provides a gelling matrix within the restructured meat product. Suitable sources of high viscosity and/or medium/high gelling isolated soy protein (i.e., unhydrolyzed) for use as the gelling protein includes SUPRO® 620, SUPRO® 500E, SUPRO® 630, and SUPRO® EX33 available from The Solae Company (St. Louis, Mo.); PROFAM 981 available from Archer Daniels Midland (Decatur, Ill.); and PROLISSE soy protein isolate available from Cargill Soy Protein Solutions, Inc. (Minneapolis, Minn.). The gelling protein is present at from 2% to 10% by weight, on a moisture free basis.

Animal fats are triglycerides with a highly saturated character. Typically animal fats are solids or waxy in nature at room temperature. The purpose of animal fats is to function as a gelling agent in the restructured meat product in the uncooked state and as a flavoring aid in the cooked state. The animal fats are generally present at from 1% to 30% by weight, on a moisture free basis and preferably at from 2% to 10% by weight, on a moisture free basis.

The sodium chloride and sodium phosphates are salts that are mixed into the restructured meat product to extract/solubilize myfibriller protein in the comminuted meat. These salts, in addition to being flavor enhancers, also help to bind the comminuted meat within the restructured meat product. These salts are generally present at from 0.1% to 4.0% by weight, on a moisture free basis and at from 0.1% to 1.0% by weight, on a moisture free basis, respectively. Preferably these salts are present at from 0.5% to 2.0% by weight, on a moisture free basis and at from 0.2% to 0.5% by weight, on a moisture free basis, respectively.

Colorants provide eye appeal to the restructured meat product. Colorants provide a red color to the restructured meat product in the uncooked state, as well as a brown color in the cooked state. Examples of colorants are edible colorings such as caramel color, paprika, cinnamon and FD & C (Food, Drug and Cosmetic) Red No. 3 (A.K.A. Food Red 14 and Erythrosine BS), FD & C Yellow No. 5 (A.K.A. Food Yellow 4 and Tartrazine), FD & C Yellow No. 6 (A.K.A. Food Yellow 3 and Sunset Yellow FCF), FD & C Green No. 3 (A.K.A. Food Green 3 and Fast Green FCF), FD & C Blue No. 2 (A.K.A. Food Blue 1 and Indigo Carmine), FD & C Blue No. 1 (A.K.A. Food Blue 2 and Brilliant Blue FCF), and FD & C Violet No. 1 (A.K.A. Food Violet 2 and Violet B6), as well as sodium nitrite, the latter of which also functions as a curing agent. Preferred is caramel, which can come in various color ranges.

By caramel it is meant an amorphous, dark brown, deliquescent powder or a thick liquid having a bitter taste, a burnt sugar odor and a specific gravity of approximately 1.35. It is soluble in water and dilute alcohol. Caramel is prepared by the careful, controlled heat treatment of carbohydrate or saccharide materials such as dextrose, invert sugar, lactose, malt syrup, molasses, sucrose, starch hydrolysates and fractions thereof. Other materials which may be employed during heat treatment to assist caramelization include acids (e.g. acetic acid, citric acid, phosphoric acid, sulfuric acid and sulfurous acid); and salts (e.g. ammonium, sodium or potassium carbonates, bicarbonates, dibasic phosphates or mono-basic phosphates).

In one process of manufacturing caramel described in U.S. Pat. No. 3,733,405, a liquid sugar, either cane or corn, is pumped into a reactor vessel along with one or a combination of the reagents authorized by the U.S. Food and Drug Administration and the mixture is heated. Temperatures ranging from 250° C. to 500° C. are maintained and the product is held between 15 and 250 pounds per square inch pressure (psi) while the polymerization takes place. When processing is completed the product is discharged to a flash cooler which drops the temperature to 150° F. It is then filtered, cooled and pumped to storage.

It is preferred that the colorant be present in the restructured meat product in the range of between 0.1% to 2%, preferably in the range of from 0.2% to 1% and most preferably in the range of from 0.25% to 0.75% by weight of the restructured meat product when a liquid is used.

Even though the restructured meat product is derived from a meat source, it is advantageous to add a flavorant to the restructured meat product to enhance its aroma and taste. The flavorants comprise beef flavor, pork flavor or chicken flavor. A beef flavor is preferred. The flavorants are generally present at from 0.1% to 5.0% by weight, on a moisture free basis and preferably at from 0.5% to 3.0% by weight, on a moisture free basis.

When the restructured meat product comprises a gelling protein; an animal fat; sodium chloride; sodium tripolyphosphate; a colorant; a curing agent; a flavorant comprising beef flavor, pork flavor, or chicken flavor; or mixtures of each with the other, the product and process are completed in a procedure similar to the product and process of only the (A), (B) and (C) components. The fibrous material (A) is first hydrated with water (C). When hydration is complete, a colorant is added. The comminuted meat (B) is added and the contents are mixed until a homogeneours mass is obtained. This is followed by the addition of an animal fat, a flavorant sodium chloride and sodium tripolyphosphate. In a separate vessel, the gelling protein is hydrated and when hydration is complete, the hydrated gelled protein is added to the above mass to form a homogenous restructured meat product. The homogeneous restructured meat product may be formed into strips, steaks, cutlets or patties, either by hand or by machine. The homogenous restructured meat product may also be stuffed into permeable or impermeable casings.

The invention having been generally described above, may be better understood by reference to the examples described below. The following examples represent specific but non-limiting embodiments of the present invention.

EXAMPLE 1

Added to a mixing vessel are 3625 grams of tap water at 10° C. and while stirring 1160 grams of a dried, low moisture (7% to 12%) fibrous material is added until the fibrous material is hydrated and the fibers are separated. Added to the mixer are 5216 grams of a comminuted meat of mechanically deboned chicken having a moisture content of 50%. The mechanically deboned chicken is at a temperature of from 2 to 4° C. The contents are mixed until a homogeneous restructured meat product is obtained. The restructured meat product is transferred to a Hollymatic forming machine where the restructured meat product is formed into steaks or cutlets which are then frozen.

EXAMPLE 2

The procedure of Example 1 is repeated, except that 1500 grams of a non-dried low moisture (28-35%) fibrous material is hydrated with 3175 grams water. The restructured meat product is transferred to a stuffing machine where the restructured meat product is stuffed into impermeable casings, which are then frozen. Stuffing machines are available from various commercial manufacturers including, but not limited to, HITEC Food Equipment, Inc., located in Elk Grove Village, Ill., Townsend Engineering Co., located in Des Moines, Iowa, Robert Reiser & Co., Inc., located in Canton, Mass., and Handtmann, Inc., located in Buffalo Grove, Ill.

EXAMPLE 3

Added to a first mixing vessel are 2127 grams of tap water at 12° C. and while stirring 1000 grams of a dried, low moisture (7% to 12%) fibrous material is added until the fibrous material is hydrated and the fibers are separated. Caramel coloring, 43 grams, is then added to the hydrated fibrous material. At 2° C., 4500 grams of a comminuted meat of mechanically deboned chicken having a moisture content of 50% is added. Then added are 100 grams sodium chloride and 30 grams of sodium trypolyphosphate to extract/solubilize myofibriller protein in the comminuted meat for binding. As mixing is continued, 500 grams beef fat and 100 grams beef flavor are added and mixing is continued. In a second mixing vessel, a gelling protein of 600 grams of Supro® 620 is hydrated in 1000 grams water and is added to the first mixing vessel. The contents are mixed until a homogeneous restructured meat product is obtained. The restructured meat product is transferred to a Hollymatic forming machine where the restructured meat product is formed into patties, which are then frozen.

While the invention has been explained in relation to its preferred embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. A restructured meat product, comprising;
  (A) a fibrous material consisting of soy protein, soy cotyledon fiber, wheat gluten, and starch, wherein said soy cotyledon fiber is present in the fibrous material in an amount of from 1% to 8%, by weight on a moisture free basis, wherein said wheat gluten is present in the fibrous material in an amount of from 10% to 30%, by weight on a moisture free basis, wherein said starch is present the in fibrous material in an amount of from 5% to 15%, by weight on a moisture free basis, and wherein the soy protein is selected from the group consisting of a soy protein concentrate, a soy protein isolate, and mixtures thereof;
  (B) a comminuted meat, wherein the comminuted meat has a moisture content of from about 60% by weight to about 75% by weight and the ratio of (A):(B) on a moisture free basis is 1:2 to 20; and
  (C) water, wherein the ratio of (A):(C) is from 1:1 to 7; and wherein the restructured meat product has a moisture content of at least 50% by weight.

2. The restructured meat product of claim 1 wherein the fibrous material contains from 50% to 75% soy protein, by weight on a moisture free basis.

3. The restructured meat product of claim 1 wherein the fibrous material has a moisture content of from 5% to 75%.

4. The restructured meat product of claim 1 wherein the fibrous material is an extrudate.

5. The restructured meat product of claim 1 wherein the comminuted meat is derived from an animal tissue.

6. The restructured meat product of claim 5 wherein the animal tissue comprises muscle tissue, organ tissue, connective tissue, skin or mixtures of each with the other.

7. The restructured meat product of claim 1 further comprising a gelling protein; an animal fat; sodium chloride; sodium tripolyphosphate; a colorant; a curing agent; a flavorant comprising beef flavor, pork flavor, or chicken flavor; or mixtures of each with the other.

8. The restructured meat product of claim 7 wherein the gelling protein is a soy protein isolate or a soy protein concentrate.

9. A restructured meat product, comprising;
  (A) a fibrous material consisting of soy protein, soy cotyledon fiber, wheat gluten, starch, and a flavoring agent, wherein said soy cotyledon fiber is present in the fibrous material in an amount of from 1% to 8%, by weight on a moisture free basis, wherein said wheat gluten is present in the fibrous material in an amount of from 10% to 30%, by weight on a moisture free basis, wherein said starch is present in the fibrous material in an amount of from 5% to 15%, by weight on a moisture free basis, and wherein the soy protein is selected from the group consisting of a soy protein concentrate, a soy protein isolate, and mixtures thereof;
  (B) a comminuted meat, wherein the comminuted meat has a moisture content of from about 60% by weight to about 75% by weight and the ratio of (A):(B) on a moisture free basis is 1:2 to 20; and
  (C) water, wherein the ratio of (A):(C) is from 1:1 to 7; and wherein the restructured meat product has a moisture content of at least 50% by weight.

10. The restructured meat product of claim 9 wherein the fibrous material contains from 50% to 75% soy protein, by weight on a moisture free basis.

11. The restructured meat product of claim 9 wherein the fibrous material has a moisture content of from 5% to 75%.

12. The restructured meat product of claim 9 wherein the fibrous material is an extrudate.

13. The restructured meat product of claim 9 wherein the comminuted meat is derived from an animal tissue.

14. The restructured meat product of claim 9 wherein the animal tissue comprises muscle tissue, organ tissue, connective tissue, skin or mixtures of each with the other.

15. The restructured meat product of claim 9 further comprising a gelling protein; an animal fat; sodium chloride; sodium tripolyphosphate; a colorant; a curing agent; a flavorant comprising beef flavor, pork flavor, or chicken flavor; or mixtures of each with the other.

16. The restructured meat product of claim 15 wherein the gelling protein is a soy protein isolate or a soy protein concentrate.

* * * * *